A. H. ROBINSON.
HOT AIR CONDUIT.
APPLICATION FILED JAN. 12, 1915.

1,158,855.

Patented Nov. 2, 1915.

Inventor
ARTHUR H. ROBINSON.

Witnesses

By
Attorney

COLUMBIA PLANOGRAPH CO., WASHINGTON, D. C.

UNITED STATES PATENT OFFICE.

ARTHUR H. ROBINSON, OF CLEVELAND, OHIO.

HOT-AIR CONDUIT.

1,158,855.    Specification of Letters Patent.    Patented Nov. 2, 1915.

Application filed January 12, 1915. Serial No. 1,812.

*To all whom it may concern:*

Be it known that I, ARTHUR H. ROBINSON, a citizen of the United States, residing at Cleveland, in the county of Cuyahoga and State of Ohio, have invented certain new and useful Improvements in Hot-Air Conduits, of which the following is a specification.

My invention relates to improvements in hot air conduits or pipes, the present embodiment of the invention being particularly designed and adapted for use as a hot air wall conduit or pipe for use in connection with hot air furnaces above the first floor line in conducting and distributing the hot air to the various rooms to be heated, the improved conduit or pipe being adapted to be arranged or disposed within the side walls of the various rooms or compartments of the building.

The primary object of the invention is to provide a generally improved hot air conduit or pipe of this class, of simple, cheap, and efficient construction, and provided with the usual air insulated or spaced inner and outer walls so as to prevent the over-heating of the outer walls of the conduit or pipe.

A further object is to provide an improved unit or section for such conduits which may be readily superposed above and connected to a subjacent unit or section through the medium of an improved joint or connection and improved inner and outer wall spacing members.

A still further object is the provision of an improved unit or section for such conduits which may be readily trimmed as to length as in filling in or adjusting the pipe sections between the two points of fixed or predetermined space between each other.

A still further object is the provision of an improved unit or section for such conduits which may be readily formed into the various fittings, such as elbows, T's, and the like, used in connection with such conduits, as well as improved units or sections which may be readily assembled or disassembled with relation to adjacent units or sections through the medium of an improved joint or connection, and without resorting to the use of fastening devices, crimping, soldering, and the like.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
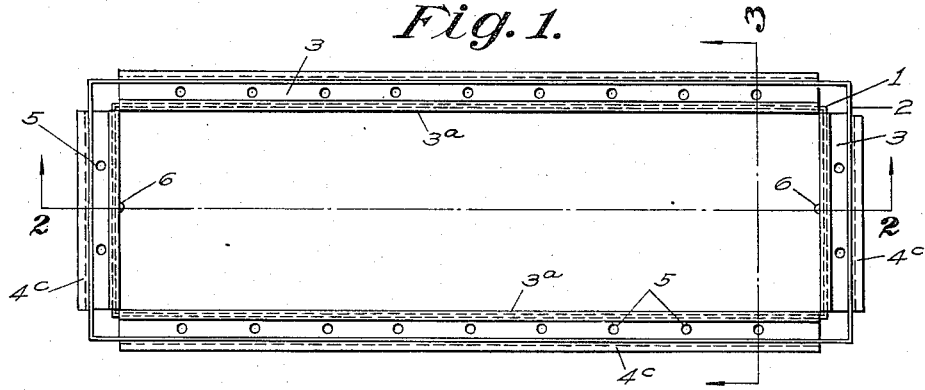
Figure 2:
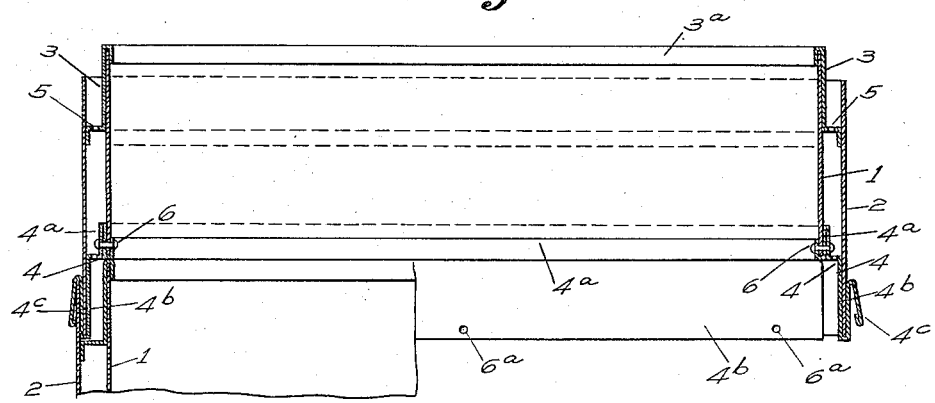
Figure 3:
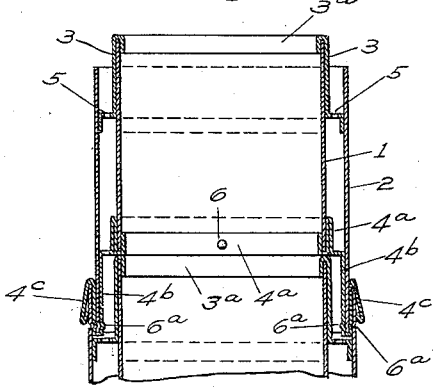

Referring to the drawings, forming a part of this specification, Figure 1, is a top plan view of an improved conduit unit or section, constructed in accordance with this invention, as it appears superposed above and connected to a subjacent unit or section. Fig. 2, a vertical longitudinal sectional view taken on line 2—2 of Fig. 1, a portion of the upper marginal walls of the subjacent unit or section being broken away for the purpose of clearer illustration of the parts. Fig. 3, a cross sectional view taken on line 3—3 of Fig. 1.

Similar numerals of reference designate like parts throughout all the figures of the drawings.

The improved conduit unit or section comprises inner and outer walls 1 and 2, respectively, connected to and spaced from each other by means of upper and lower wall spacing members 3 and 4, respectively, said spacing members 3 and 4, being provided at suitable intervals with air openings or ports 5, for the circulation of air within the air insulating space between the inner and outer walls.

The upper marginal edge of the inner wall 1, preferably projects above the plane of the upper marginal edge of the outer wall 2, and the lower marginal edge of the inner wall 1, is preferably spaced above the plane of the lower marginal edge of the outer wall 2, and is permanently connected to the latter through the medium of the lower spacing member 4, which spacing member 4, consists of an inner wall receiving flanged portion 4ª, and an outer wall receiving flanged portion 4ᵇ, the latter terminating in an outstanding depending skirt portion 4ᶜ, to receive the upper marginal edges of the outer wall 2, of a subjacent unit or section as shown.

The upper wall spacing member 3, is provided with an inner wall receiving flanged portion 3ª, to receive and contain the upper marginal edge of the inner wall 1, and as a means of providing for the convenient trimming of the upper marginal edges of the unit or section, the upper spacing members 3, are removably mounted and connected to the walls 1 and 2, being secured thereto through frictional contact or engagement so that the same may be readily removed for cutting down or trimming the upper marginal edges and thereafter readily inserted. The lower wall spacing members 4, however, are preferably secured to the lower marginal edges of the inner wall 1, through the medium of rivets 6, passing through the flanged portion 4ª, as shown most clearly in Fig. 2 of the drawings, and as a further means of securing the lower wall spacing members 4, to the lower marginal edges of the outer wall, suitable indentations 6ª, may be made so that the lower marginal edges of the spacing member 4, will be securely interlocked with the lower marginal edges of the outer wall 2, as shown most clearly in Fig. 3 of the drawings.

It will be seen that the inner wall receiving flanged portion 3ª, of the upper wall spacing member 3, forms a seat to receive and abut against the inner wall receiving flanged portion 4ª, of the lower wall spacing member 4, and it will also be apparent that the depending skirt portion 4ᶜ, forms a convenient recess to receive and direct the upper marginal edges of the subjacent unit or section in the act of assembling such units or sections to form a complete hot air conduit so that the act of assembling or disassembling of the units or sections may be quickly and conveniently carried out and such skirt portion 4ᶜ, also serves to seal the joint as well as secure the parts in permanent position without the necessity of resorting to fastening devices or crimping or soldering as now frequently found necessary where a short or abrupt flaring or wedge shaped joint or edge is employed.

From the foregoing description, taken in connection with the accompanying drawings the operation and advantages of my invention will be readily understood.

Having thus described one of the embodiments of my invention, what I claim and desire to secure by Letters Patent, is,—

1. A hot air conduit unit, comprising inner and outer walls, and upper and lower wall spacing members provided with inner and outer wall receiving flanged portions, respectively, said upper wall spacing members being removable and said lower wall spacing members having depending skirted portions.

2. A hot air conduit unit, comprising inner and outer walls connected by inner and outer wall receiving spacing members, said inner wall receiving spacing members being removable, and said outer wall receiving spacing members being provided with depending marginal skirt portions.

In testimony whereof I have affixed my signature in presence of two witnesses.

ARTHUR H. ROBINSON.

Witnesses:
O. C. BILLMAN,
DAVID MORISON.

Copies of this patent may be obtained for five cents each, by addressing the "Commissioner of Patents, Washington, D. C."